United States Patent
Cai et al.

(10) Patent No.: US 12,103,109 B2
(45) Date of Patent: Oct. 1, 2024

(54) NANOSECOND LASER ABLATION AND CHEMICAL THERMAL DECOMPOSITION COMBINED METHOD FOR PREPARING SUPER-HYDROPHOBIC MICRO-NANO STRUCTURE ON STAINLESS STEEL SURFACES

(71) Applicant: SHANDONG UNIVERSITY, Shandong (CN)

(72) Inventors: Yukui Cai, Jinan (CN); Zhanqiang Liu, Jinan (CN); Xichun Luo, Jinan (CN); Yi Wan, Jinan (CN); Qinghua Song, Jinan (CN); Bing Wang, Jinan (CN); Yiping Tang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 911 days.

(21) Appl. No.: 17/254,325

(22) PCT Filed: Dec. 28, 2019

(86) PCT No.: PCT/CN2019/129540
§ 371 (c)(1),
(2) Date: Dec. 21, 2020

(87) PCT Pub. No.: WO2021/082262
PCT Pub. Date: May 6, 2021

(65) Prior Publication Data
US 2021/0370443 A1    Dec. 2, 2021

(30) Foreign Application Priority Data

Oct. 31, 2019  (CN) .......................... 201911063359.2

(51) Int. Cl.
*B23K 26/352* (2014.01)
*B05D 3/10* (2006.01)
(Continued)

(52) U.S. Cl.
CPC ............ *B23K 26/352* (2015.10); *B05D 3/102* (2013.01); *B23K 26/36* (2013.01); *B23K 2103/05* (2018.08); *B82Y 30/00* (2013.01)

(58) Field of Classification Search
CPC .............................. B23K 26/352; B23K 25/36
See application file for complete search history.

(56) References Cited

FOREIGN PATENT DOCUMENTS

| CN | 104907701 A | 9/2015 |
|----|-------------|--------|
| CN | 104907702 A | 9/2015 |

(Continued)

OTHER PUBLICATIONS

Picosecond Laser-Textured Stainless Steel Superhydrophobic Surface with an Antibacterial Adhesion Property. Qiaofei Pan, Yu Cao, Wei Xue, Dehua Zhu, and Wenwen Liu. Aug. 9, 2019. American Chemical Society. pp. 1141-11421. (Year: 2019).*

(Continued)

*Primary Examiner* — Dah-Wei D. Yuan
*Assistant Examiner* — Kristen A Dagenais
(74) *Attorney, Agent, or Firm* — Oliff PLC

(57) ABSTRACT

A nanosecond laser ablation and chemical thermal decomposition for preparing a super-hydrophobic micro-nano structure on stainless steel. The method solves the defects of long preparation cycle and complex process flow of a super-hydrophobic surface of stainless steel, and does not use fluorine-containing chemical reagents for modification. The method includes: ultrasonically cleaning a stainless steel sample piece in absolute ethanol and air-drying at room temperature; performing primary infrared nanosecond laser ablation on the sample piece to obtain a micro-nano structure; evenly coating a surface of the workpiece with microdroplets of a stearic acid ethanol solution by using an ultrasonic atomizer; performing secondary infrared nanosecond laser ablation on the sample piece; and ultrasonically cleaning the sample piece with acetone, absolute ethanol, and deionized water respectively for 10 minutes to remove undecomposed stearic acid and slag, thereby obtaining a stainless steel super-hydrophobic surface with stable super-hydrophobic property and good quality.

7 Claims, 2 Drawing Sheets

(51) Int. Cl.
*B23K 26/36* (2014.01)
*B23K 103/04* (2006.01)
*B82Y 30/00* (2011.01)

(56) References Cited

FOREIGN PATENT DOCUMENTS

| CN | 108515269 A | | 9/2018 | |
|---|---|---|---|---|
| CN | 109954965 A | | 7/2019 | |
| CN | 110340532 A | * | 10/2019 | ........... B23K 26/352 |
| CN | 110340789 A | | 10/2019 | |
| SE | 1600237 A1 | | 8/2016 | |

OTHER PUBLICATIONS

Qiaofei, Pan et al., "Technology and Mechanism Analysis on Ultrasonic Super-hydrophobic Surface by Ultraviolet Nanosecond Laser Etching" Journal of Wenzhou University (Natural Science Edition), vol. 40, No. 1, pp. 56-62, 2019.

Jul. 29, 2020 International Search Report issued in International Patent Application No. PCT/CN2019/129540.

Jul. 29, 2020 Written Opinion issued in International Patent Application No. PCT/CN2019/129540.

* cited by examiner

NANOSECOND LASER ABLATION AND CHEMICAL THERMAL DECOMPOSITION COMBINED METHOD FOR PREPARING SUPER-HYDROPHOBIC MICRO-NANO STRUCTURE ON STAINLESS STEEL SURFACES

BACKGROUND

Technical Field

The present invention belongs to the technical field of material surface modification, and relates to a technology for improving the super-hydrophobic surface of stainless steel materials, and specifically to a nanosecond laser ablation and chemical thermal decomposition combined method.

Related Art

Information disclosed in the related art section is merely for better understanding of the overall background of the present invention, and should not be taken as an acknowledgment or any suggestion that the information constitutes the prior art that is well known to those of ordinary skill in the art.

Stainless steel materials have a wide range of application in medical equipment (such as surgical instruments and medical trays), ships (propellers, cargo holds and the like), aerospace (aircraft structural parts, chemical fuel pressure vessels and the like), and other fields. Stainless steel itself is a hydrophilic material, and has a static contact angle less than 90°. By fabricating a micro-nano structure on the surface of stainless steel and modifying the surface with a fluorine-containing low surface energy chemical reagent, a surface with a super-hydrophobic property can be obtained. The super-hydrophobic stainless steel surface has great application prospects in the fields of self-cleaning, anti-fouling, anti-icing, rent reduction, anti-corrosion of sea water and salt spray, anti-biofilm adhesion and antibacterial. Laser ablation has the characteristics of high efficiency, stability, reliability and low cost, and is a technology suitable for industrial promotion and application to prepare super-hydrophobic micro-nano structures on metal surfaces.

At present, there are three methods for preparation of super-hydrophobic surfaces with laser: the first method includes laser processing first and then standing in the air for a period of time, and the principle is that the laser processing forms a micro-nano structure, and the micro-nano structure is placed in an air environment to gradually adsorb organic matters in the air, thereby reducing the surface energy, and realizing super-hydrophobicity of the surface; the second method includes laser processing first and then high-temperature treatment, and the principle is that the adsorption of organic matters on the surface is speeded up through high temperature, and the surface energy is quickly reduced to obtain a super-hydrophobic surface; the first and second methods require a long cycle, and the obtained super-hydrophobic property of the surface is unstable; and the third method includes laser processing first and then modification with fluoroalkyl silane, while the environmental pollution caused by fluorine and its compounds has been recognized internationally, and due to long-lasting environmental stability and high bioaccumulation, some fluorosurfactants have been included in the list of persistent organic pollutants (POPs) by the United Nations and are banned.

SUMMARY

In order to overcome the above problems, the present invention provides a nanosecond laser ablation and chemical thermal decomposition combined method for preparing a super-hydrophobic micro-nano structure on stainless steel surfaces. First, a micro-nano structure is formed on the surface of stainless steel by a high-power laser ablation process, then micro-droplets of a stearic acid ethanol solution are generated by ultrasonic vibration and sprayed onto the surface of the micro-nano structure, and finally, secondary ablation is performed on the surface with low-power laser to make stearic acid particles decompose at high temperature to form carbides which are solidified on the surface of the micro-nano structure, and thereby increasing the surface carbon content, and reducing the surface energy to realize single-process fabrication of the super-hydrophobic micro-nano structure. The present invention solves the defects of long cycle, high cost and the use of fluorine-containing chemical reagents to reduce surface energy in preparation of the super-hydrophobic micro-nano structure of stainless steel.

In order to achieve the above technical objectives, the technical solutions adopted by the present invention are as follows:

a nanosecond laser ablation and chemical thermal decomposition combined method for preparing a super-hydrophobic micro-nano structure on stainless steel surfaces, including:

pretreating stainless steel;

performing laser ablation on the pretreated stainless steel to form a micro-nano structure;

depositing stearic acid micro-nano particles on the micro-nano structure;

performing secondary laser ablation to decompose the stearic acid; and preforming after-treatment.

By the existing method of laser processing first and then absorption of organic matters in the air for achieving super-hydrophobicity, the obtained super-hydrophobic surface is low in reliability. Cleaning with acetone or alcohol can remove the organic matters adsorbed on the surface, and further causes a sample piece to lose hydrophobicity. The method provided by the present invention uses nanosecond laser heat energy to decompose stearic acid into carbides, the carbides and the molten matrix are doped together under the action of laser to increase the carbon content on the surface of the workpiece, and after residual stearic acid is removed by ultrasonic cleaning with acetone and alcohol, the super-hydrophobicity of the sample piece can still be maintained.

The method of pretreatment in the present application is not particularly limited. In some embodiments, the pretreatment includes cleaning, impurity removal, and air drying for removing oil stains, impurities and the like on the surface of stainless steel to ensure the subsequent laser ablation effect.

In some embodiments, the laser ablation adopts infrared nanosecond laser pulses. Compared with picosecond lasers, nanosecond lasers have the characteristics of high processing efficiency and low cost.

In some embodiments, parameters of laser ablation are that an average nanosecond laser power is 5-20 W, a pulse frequency is 20-200 kHz, a scanning speed is 100-2000 mm/min, and a scanning interval is 20-100 μm. The method provided by the present invention prepares the super-hydrophobic micro-nano structure with higher quality and efficiency, and can be completed in one procedure on a laser processing platform; a process chain is shortened, and a preparation period is reduced.

At present, cleaning the super-hydrophobic surface of the micro-nano structure modified directly with stearic acid with acetone or alcohol can cause that the stearic acid on the surface dissolves, and the sample piece loses the hydrophobic property. The method provided by the present invention uses the thermal effect of nanosecond laser to realize the decomposition of stearic acid, so that carbides are firmly connected to the surface of the sample piece, and the stability of the hydrophobic property is increased.

As the concentration of stearic acid increases, the deposition of stearic acid particles increases. However, when the stearic acid content reaches a certain concentration, continuous increase of the stearic acid content cannot increase the carbon content of the stainless steel surface much. Therefore, in some embodiments, a mass ratio of stearic acid to ethanol in the stearic acid ethanol solution is 2%-4%.

In order to ensure that stearic acid is uniformly deposited on the surface of the micro-nano structure, in some embodiments, a method of depositing stearic acid micro-nano particles includes: ultrasonically atomizing the stearic acid ethanol solution, uniformly spraying a layer of micro-droplets of the stearic acid ethanol solution on a surface of the workpiece, evaporating the ethanol, and depositing the stearic acid micro-nano particles on the surface of the micro-nano structure. A moving speed of an ultrasonic atomization device is 1000-2000 mm/min, a distance from the surface of the workpiece is 25-35 mm, and an interval between two sprays is 4-6 mm.

In some embodiments, parameters of the secondary laser ablation are that an average laser power is 0.1-1 W, a pulse frequency is 20-200 kHz, a scanning speed is 1000-2000 mm/min, and a scanning interval is 20-100 μm. Secondary ablation is performed on the surface with low-power laser to make stearic acid particles decompose at high temperature, and the carbon element solidify on the surface of the micro-nano structure, and thereby increasing the surface carbon content, and reducing the surface energy to realize single-process fabrication of the super-hydrophobic micro-nano structure.

The present invention also provides stainless steel with a super-hydrophobic micro-nano structure on a surface, prepared by any of the above methods.

The present invention has the following beneficial effects:

(1) Fabrication of the super-hydrophobic micro-nano structure can be realized by a short process flow by clamping a stainless steel sample piece on a laser processing platform once, after-treatment with fluorine-containing chemical reagents is not required, and the preparation cycle is shortened.

(2) The stearic acid ethanol solution is uniformly dispersed into micro-droplets by the ultrasonic spray method to ensure uniform distribution of stearic acid particles on the surface of the micro-nano structure.

(3) The infrared nanosecond laser adopted in the present invention has the characteristics of low cost and high efficiency, and is suitable for preparing large-area stainless steel super-hydrophobic surfaces.

(4) The method provided by the present invention utilizes the thermal effect of infrared laser ablation to realize thermal decomposition of stearic acid particles, and close combination of the carbon element and the micro-nano structure is increased. Even after ultrasonic cleaning with acetone and absolute ethanol respectively for 10 minutes, the super-hydrophobic property is still good, and a contact angle of 4 microliters of water droplets is still greater than 162°.

(5) The operation method of the present application is simple, low-cost, practical, and easy to popularize.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

Figure 1:
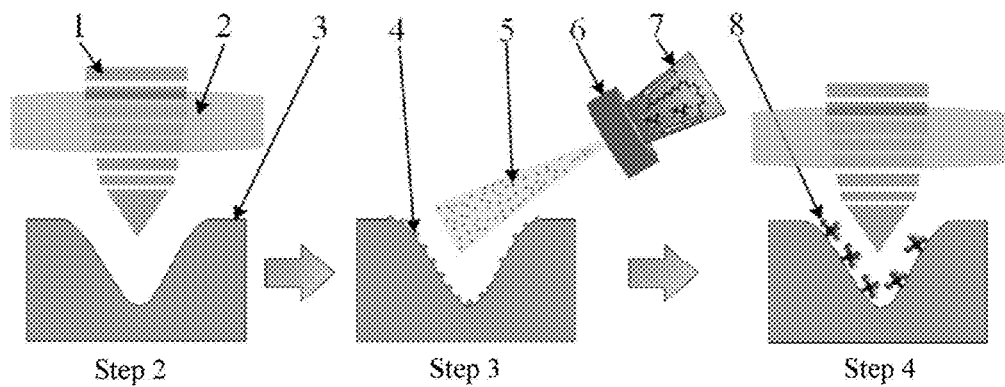
FIG. 1 is a schematic diagram of a nanosecond laser ablation and chemical thermal decomposition combined method for preparing a super-hydrophobic micro-nano structure on stainless steel surfaces of Embodiment 1 of the present invention.

In the figures, 1 represents infrared nanosecond laser pulse, 2 represents laser focusing lens, 3 represents 316L stainless steel sample piece, 4 represents stearic acid particles, 5 represents micro-droplets of stearic acid ethanol solution, 6 represents ultrasonic atomizer, 7 represents stearic acid ethanol solution, and 8 represents carbide.

DETAILED DESCRIPTION

It should be noted that, the following detailed descriptions are exemplary, and are intended to provide a further description to this application. Unless otherwise specified, all technical and scientific terms used herein have the same meaning as commonly understood by those of ordinary skill in the art to which this application belongs.

It should be noted that terms used herein are only for the purpose of describing specific implementations and are not intended to limit the exemplary implementations of this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

As introduced in the related art, the current preparation method of the surface super-hydrophobic micro-nano structure has the problem of long cycle or environmental pollution. Therefore, the present invention provides a nanosecond laser ablation and chemical thermal decomposition combined method for preparing a super-hydrophobic micro-nano structure on a stainless steel surface, including the following steps:

Step (1): Pretreatment: a stainless steel sample piece is cleaned ultrasonically with absolute ethanol to remove surface oil stains and impurities, and air-dried at room temperature.

Step (2): The workpiece cleaned and air-dried in step 1 is placed on an infrared nanosecond laser processing platform; a laser focus is adjusted to an upper surface of the workpiece, and linear scanning is performed at equal intervals according to the laser power, frequency, scanning speed and interval required by an experiment.

Step (3): An ethanol solution of stearic acid is prepared, the solution is poured into an ultrasonic atomizer, the ultrasonic atomizer is started, a layer of microdroplets of the stearic acid ethanol solution is evenly coated on the surface of the workpiece, and the ethanol is quickly evaporated, so that stearic acid micro-nano particles are deposited on the surface of the micro-nano structure.

Step (4): Laser power is reduced, laser processing is performed again using the program code in step 2, and the stearic acid decomposes by the heat of laser ablation, so that the surface carbon content is increased, and the surface energy is reduced.

Step (5): After-treatment: the sample piece obtained in step 4 is ultrasonically cleaned with acetone, absolute ethanol, and deionized water respectively, so as to remove the undecomposed stearic acid and slag produced by laser ablation adhered to the surface, and obtain a stainless steel surface with a stable super-hydrophobic property.

Preferably, the ultrasonic cleaning time with absolute ethanol in step (1) is 5 minutes.

Preferably, in step (2), the average laser power is 20 W, the pulse frequency is 100 kHz, the scanning speed is 2000 mm/min, and the scanning interval is 25-50 μm.

Preferably, the mass ratio of the stearic acid to the absolute ethanol solution in step (3) is 2%-4%, and the mixed solution is placed in constant temperature water at 70-90° C. to accelerate the dissolution of stearic acid.

Preferably, in step (4), the average laser power is 0.2 W, the pulse frequency is 100 kHz, the scanning speed is 2000 mm/min, and the scanning interval is the same as that in step (2).

Preferably, the ultrasonic cleaning time of acetone, absolute ethanol, and deionized water in step (5) is 10 minutes respectively.

The present invention will be further described in detail below in conjunction with specific embodiments. It should be pointed out that the specific embodiments are for explaining rather than limiting the present invention.

Embodiment 1

(1) Pretreatment: a 10 mm×10 mm×2 mm stainless steel sample was ultrasonically cleaned in absolute ethanol for 5 minutes to remove surface oil stains and impurities, and air dried at room temperature.

(2) Primary ablation with infrared nanosecond laser: referring to FIG. 1, the pretreated workpiece was placed on an infrared nanosecond laser processing platform; the laser focus was adjusted to the upper surface of the workpiece, and the parameters were set as that the average laser power was 20 W, the pulse frequency was 100 kHz, the scanning speed was 2000 mm/min, and the laser scanning interval was 25 μm.

(3) Deposition of stearic acid particles: referring to FIG. 1, an absolute ethanol solution of stearic acid with the mass ratio of 3% was atomized using an ultrasonic atomization device, a layer of micro-droplets of the stearic acid ethanol solution was evenly sprayed on the surface of the sample piece, where the moving speed of the ultrasonic atomization device was 2000 mm/min, the distance from the surface of the workpiece was 30 mm, and the interval between two sprays was 5 mm.

(4) Secondary ablation with infrared nanosecond laser: referring to FIG. 1, the average laser power was 0.2 W, the pulse frequency was 100 kHz, the scanning speed was 2000 mm/min, and the laser scanning interval was 25 μm.

Figure 2:
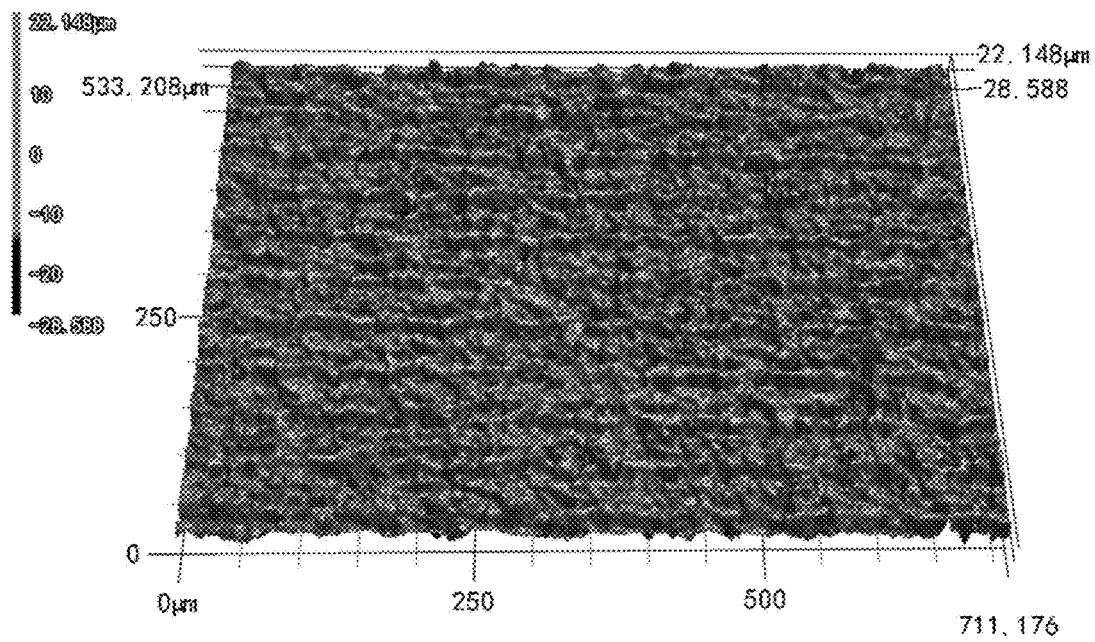
FIG. 2 is a three-dimensional morphology diagram of a 316L stainless steel sample piece processed by the preparation method of Embodiment 1 of the present invention.
Figure 5:
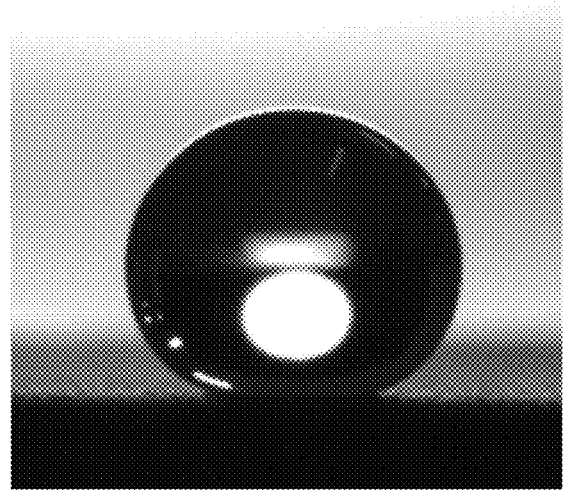
FIG. 5 shows the static contact angle of the surface of the 316L stainless steel prepared in Embodiment 1 of the present invention.

(5) Sample piece cleaning: the obtained sample piece was ultrasonically cleaned with acetone, absolute ethanol, and deionized water respectively for 10 minutes, so as to remove the undecomposed stearic acid and the slag produced by laser ablation adhered to the surface. The super-hydrophobic micro-nano structure of the 316L stainless steel prepared in Embodiment 1 is shown in FIG. 2, and the contact angle of the sample piece is shown in FIG. 5, which is 162°.

Comparative Example 1

Figure 3:
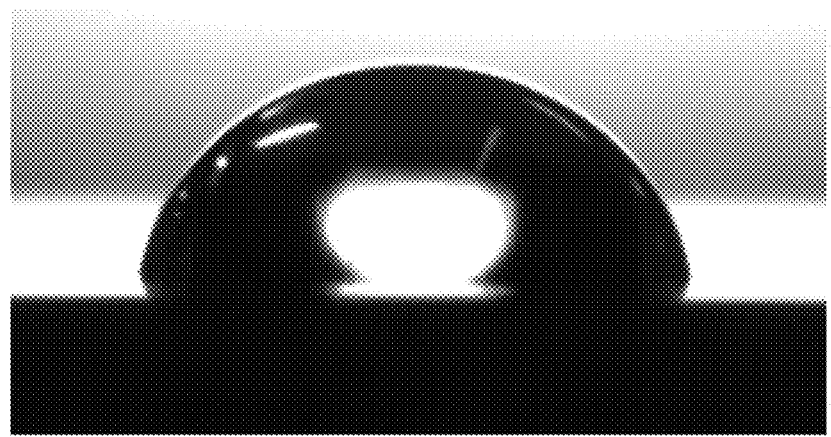
FIG. 3 shows the static contact angle of the surface of an unprocessed 316L stainless steel sample piece in Comparative example 1.

The difference between this comparative example and Embodiment 1 is that only step (1) is adopted. The contact angle of the smooth stainless steel sample piece of Comparative example 1 is shown in FIG. 3, and the contact angle is 78°.

Comparative Example 2

Figure 4:
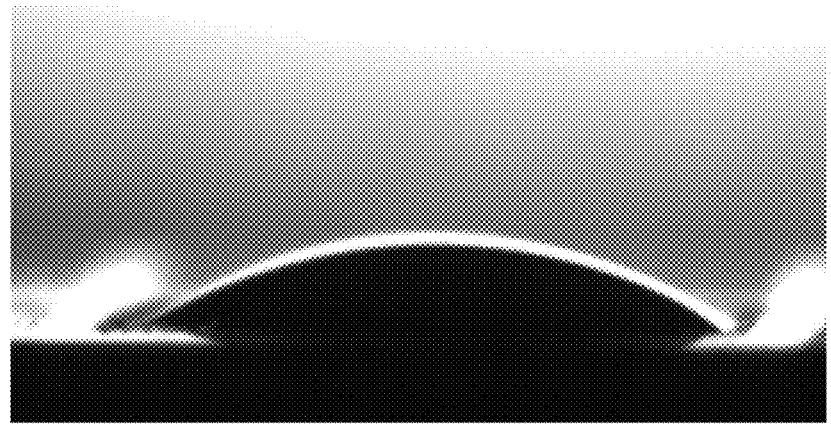
FIG. 4 shows the static contact angle of a 316L stainless steel sample piece only subjected to laser processing in step 1 in Comparative example 2.

The difference between this comparative example and Embodiment 1 is that only steps (1), (2) and (5) are adopted, and steps (3) and (4) are omitted. The contact angle of the sample piece prepared in Comparative example 2 is shown in FIG. 4, and the contact angle is 32°.

The trademark of the stainless steel material used in the present embodiment and the comparative examples is 316L.

It should be finally noted that, the foregoing descriptions are merely preferred embodiments of the present invention, but are not intended to limit the present invention. Although the present invention is described in detail with reference to the foregoing embodiments, those skilled in the art should understand that they may still make modifications to the technical solutions described in the foregoing embodiments or make equivalent replacements to some technical features thereof. Any modification, equivalent replacement, or improvement made within the spirit and principle of the present invention shall fall within the protection scope of the present invention. The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A nanosecond laser ablation and chemical thermal decomposition combined method for preparing a super-hydrophobic micro-nano structure on stainless steel surfaces, comprising:
   pretreating stainless steel;
   performing laser ablation on the pretreated stainless steel to form a micro-nano structure;
   depositing stearic acid micro-nano particles on the micro-nano structure;
   performing secondary laser ablation to decompose the stearic acid; and
   preforming after-treatment;
   wherein the depositing of stearic acid micro-nano particles comprises: ultrasonically atomizing a stearic acid ethanol solution, evenly coating a surface of the workpiece with a layer of micro-droplets of the stearic acid ethanol solution, evaporating the ethanol, and depositing the stearic acid micro-nano particles on the surface of the micro-nano structure.

2. The nanosecond laser ablation and chemical thermal decomposition combined method for preparing a super-hydrophobic micro-nano structure on stainless steel surfaces according to claim 1, wherein the pretreatment comprises cleaning, impurity removal, and air drying.

3. The nanosecond laser ablation and chemical thermal decomposition combined method for preparing a super-hydrophobic micro-nano structure on stainless steel surfaces according to claim 1, wherein the laser ablation adopts infrared nanosecond laser pulses.

4. The nanosecond laser ablation and chemical thermal decomposition combined method for preparing a super-hydrophobic micro-nano structure on stainless steel surfaces according to claim 1, wherein parameters of the laser ablation are that an average nanosecond laser power is 5-20 W, a pulse frequency is 20-200 kHz, a scanning speed is 100-2000 mm/min, and a scanning interval is 20-100 μm.

5. The nanosecond laser ablation and chemical thermal decomposition combined method for preparing a super-hydrophobic micro-nano structure on stainless steel surfaces according to claim 1, wherein a mass ratio of stearic acid to ethanol in the stearic acid ethanol solution is 2%-4%.

6. The nanosecond laser ablation and chemical thermal decomposition combined method for preparing a super-hydrophobic micro-nano structure on stainless steel surfaces according to claim 1, wherein a moving speed of an ultrasonic atomization device is 1000-2000 mm/min, a distance from the surface of the workpiece is 25-35 mm, and an interval between two sprays is 4-6 mm.

7. The nanosecond laser ablation and chemical thermal decomposition combined method for preparing a super-hydrophobic micro-nano structure on stainless steel surfaces according to claim 1, wherein parameters of the secondary laser ablation are that an average laser power is 0.1-1 W, a pulse frequency is 20-200 kHz, a scanning speed is 1000-2000 mm/min, and a scanning interval is 20-100 μm.

\* \* \* \* \*